United States Patent [19]

Crock

[11] 4,154,423

[45] May 15, 1979

[54] APPARATUS FOR THE CONSTRUCTION OF A DOMED STRUCTURE SUCH AS AN IGLOO

[76] Inventor: Francis S. Crock, 8418 State Rte. 43, Kent, Ohio 44240

[21] Appl. No.: 829,956

[22] Filed: Sep. 1, 1977

Related U.S. Application Data

[63] Continuation-in-part of Ser. No. 630,926, Nov. 11, 1975, abandoned.

[51] Int. Cl.[2] .......................... B29C 1/00; B28B 7/34

[52] U.S. Cl. .................................. 249/134; 249/117; 249/154

[58] Field of Search ...................... 249/117, 154, 134; 425/DIG. 44; D7/21, 189, 187; D9/219, 242; D87/1 R

[56] References Cited

U.S. PATENT DOCUMENTS

D. 246,342 11/1977 Yonkers .............................. D9/219

2,712,224 7/1955 Roethel ........................... 249/134 X 3,431,601 3/1969 Lipscomb ........................ 249/117 X

FOREIGN PATENT DOCUMENTS 43-11789 5/1968 Japan .................................. 249/154

*Primary Examiner*—Richard B. Lazarus

*Attorney, Agent, or Firm*—Scrivener, Parker, Scrivener & Clarke

[57] ABSTRACT

Two molds, each comprising an open top container having side walls, end walls, and a bottom, are provided for forming blocks of snow or ice which are used to form a complete domed structure such as an igloo. The configuration of one mold is such that blocks formed by it will fit together to form a circular upwardly converging wall, and the configuration of the other mold is such that blocks formed by it will fit together to form a circular dome which rests on the upper surface of the wall to complete the structure.

1 Claim, 11 Drawing Figures

Fig. 5
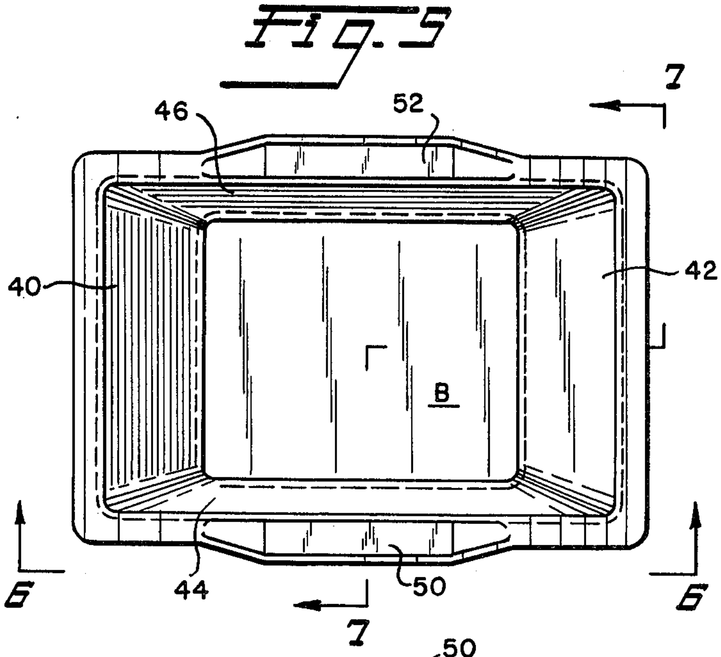
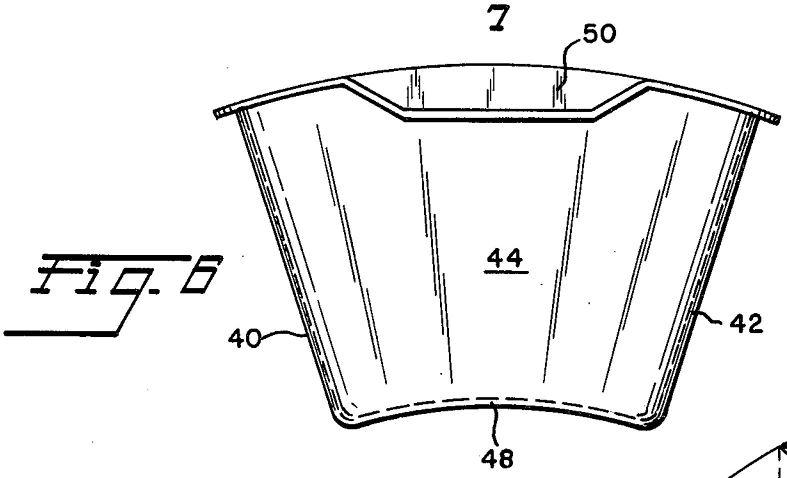
Fig. 6
Fig. 7
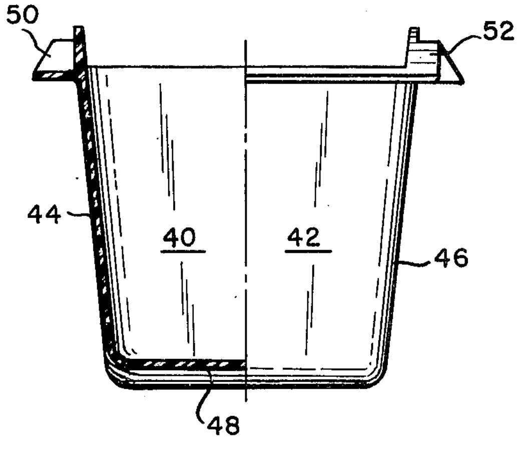
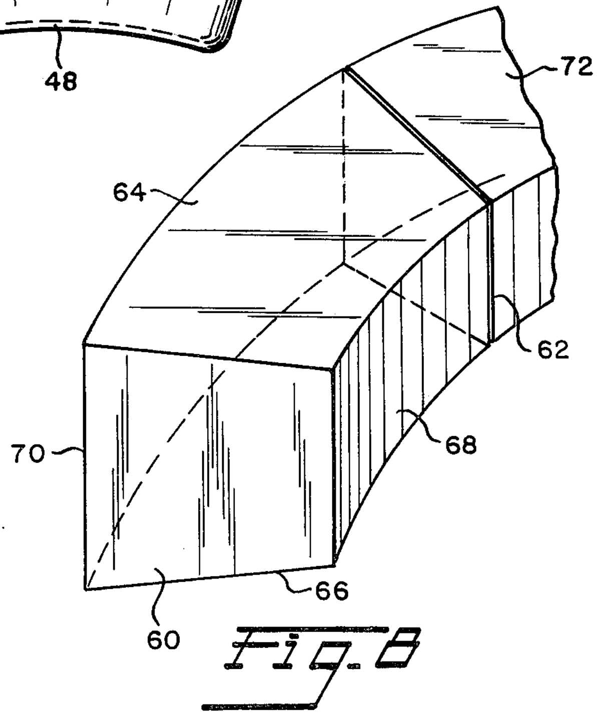
Fig. 8

APPARATUS FOR THE CONSTRUCTION OF A DOMED STRUCTURE SUCH AS AN IGLOO

This application is a continuation in part of application Ser. No. 630,926, filed Nov. 11, 1975, now abandoned.

BACKGROUND OF THE INVENTION

The invention has to do with the construction of hollow domed structures, such as the igloo, which are used for human habitation and storage in areas abounding in ice and snow but which are sparsely provided with construction materials such as wood. Such structures have heretofore been made by sculpting snow or by making blocks of snow or ice and fitting them together in a cut-and-try process. Both methods are generally unsatisfactory and time consuming, and it has been the object of this invention to provide simple apparatus which may be easily carried and stored in a small space and which, without other apparatus or tools, may be used to build a complete domed structure. An additional object of the invention is to provide means to educate young adults in the construction of structures used for habitation from material supplied by nature.

SUMMARY OF THE INVENTION

Two open top containers are provided each having end walls, side walls, and a bottom, which are used as molds for snow or ice to form blocks used in building a domed structure. The end walls of the first of these molds converge toward the bottom at such an angle that blocks formed by this mold, when placed end to end with the bottoms of the blocks facing inwardly, form a circular tier, and the side walls converge toward the bottom at such an angle that when successive tiers are superposed they form an upwardly converging circular wall. The end walls of the second mold converge toward the bottom at such an angle that blocks formed by this mold, when placed end to end with the bottoms of the blocks facing inwardly, form a circular tier, and the side walls converge toward the bottom at an angle which is greater than the angle of convergence of the side walls of the first mold and which is such that successive tiers of blocks formed by the second mold, when positioned to extend upwardly from the upper surface of the highest tier of the wall formed by blocks from the first mold, form the dome of the structure.

DESCRIPTION OF THE DRAWINGS

FIG. 5 is a top plan view of the mold used to form blocks which comprise the domed upper part of the structure;

FIGS. 6 and 7 are, respectively, sectional views taken on lines 6—6 and 7—7 of FIG. 5;

FIG. 8 is a perspective view of blocks, for example of snow, formed by use of the mold illustrated in FIGS. 5 to 7;

DESCRIPTION OF THE INVENTION

Figure 1:
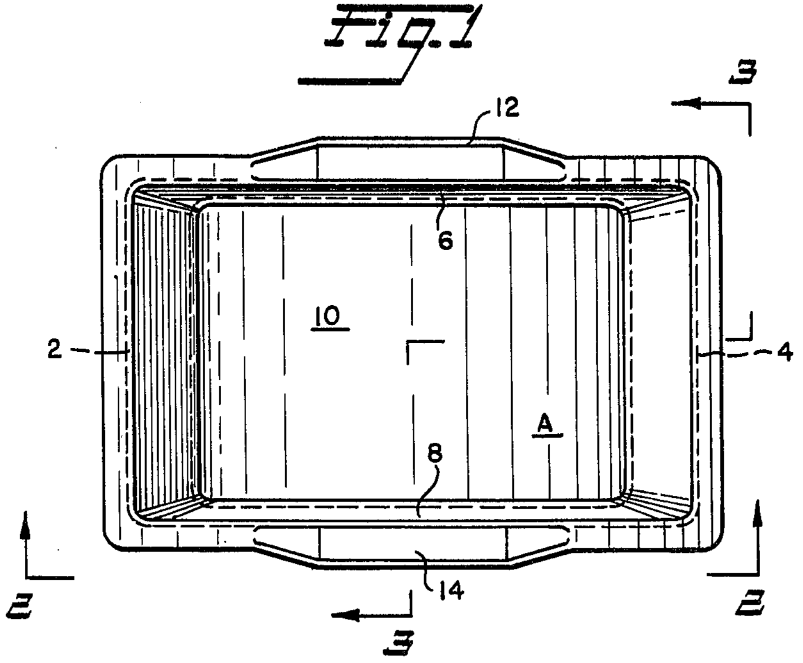
FIG. 1 is a top plan view of the mold used to form blocks which comprise the lower wall of the domed structure.
Figure 2:
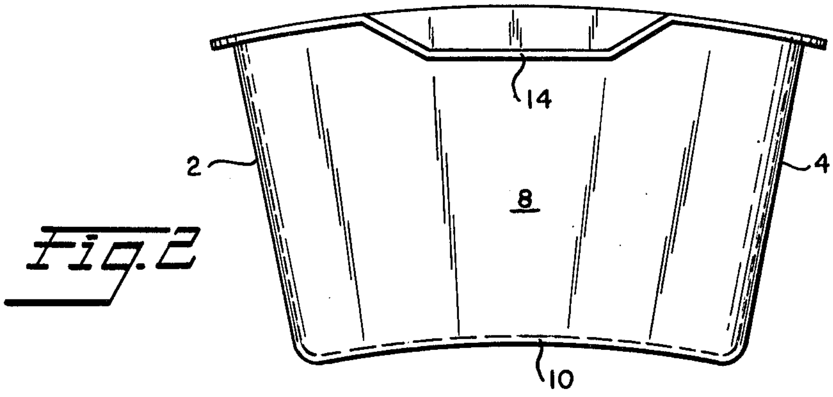
FIGS. 2 and 3 are, respectively, sectional views taken on lines 2—2 and 3—3 of FIG. 1.
Figure 3:
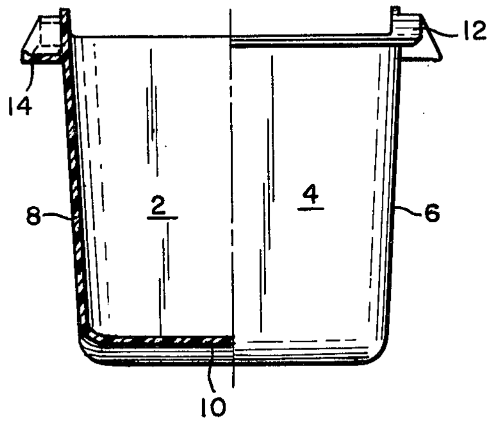
Figure 11:
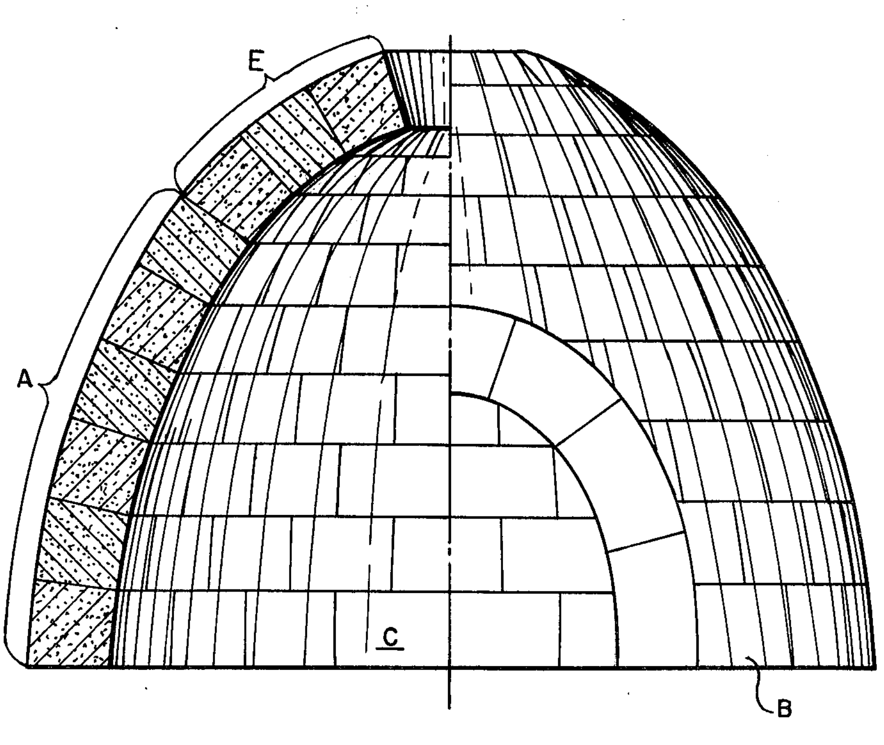
FIG. 11 is a vertical sectional view through a domed structure made from blocks formed by the molds illustrated in the other figures of the drawings.

The first of the two molds provided by the invention is disclosed at A in FIGS. 1, 2 and 3 and is constructed and adapted to make blocks of snow or ice which will form the circular, upwardly converging lower wall B of a domed structure such as the igloo shown in vertical section in FIG. 11. The general configuration of the mold is that of an open top container having end walls 2, 4, side walls 6, 8 and an inwardly curved bottom 10. Hand holds 12, 14 may be provided at the upper edges of the side walls, and extending outwardly therefrom, to facilitate handling of the mold.

Figure 4:
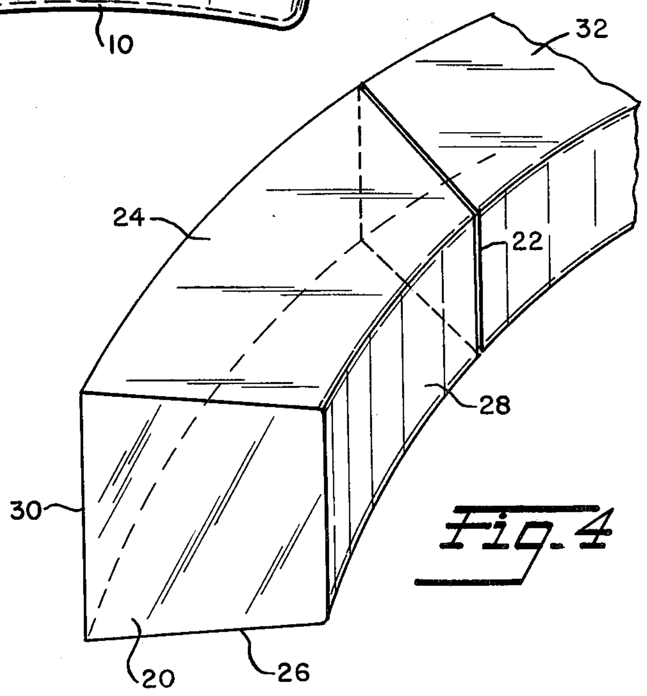
FIG. 4 is a perspective view of blocks, for example of snow, formed by use of the mold illustrated in FIGS. 1 to 3.

In accordance with the invention the end walls 2, 4 of this first mold converge toward the bottom 10 at such an angle that when blocks made with this mold are laid end to end with their side walls generally horizontal and their adjacent end walls flush against each other the blocks form a circular tier such as that indicated by the letter C in FIG. 11, and one of which is partially shown in FIG. 4. In the embodiment of the invention disclosed in the drawings, each of these end walls extends outwardly at an angle of approximately 100° to the chord of the bottom 10, and the end walls therefore converge at an angle of approximately 20° to each other. The side walls 6, 8 of this first mold converge toward the bottom at such an angle that when tiers of blocks made from this mold are superposed one on the other with adjacent side walls flush against each other, a wall will be formed (which will be circular because of the described configuration of the abutting end walls of the blocks) which will be upwardly convergent as shown by the tiers indicated by letter B in FIG. 11. In the embodiment of the invention disclosed in the drawings each of these side walls extends outwardly at an angle of approximately 95° to the transverse line of the bottom, and the side walls therefore converge toward each other at an angle of approximately 10° to each other.

In FIG. 4 of the drawings there is illustrated a block of snow, ice or the like formed in the mold illustrated in FIGS. 1 to 3, and having the end walls 20, 22, side walls 24, 26, bottom wall 28 and outer wall 30, and part of a second similarly formed block 32 is shown in end wall-to-end wall abutting relation to the first block in order to illustrate the formation of a circular tier by the juxtaposition of these blocks. The diameter of the circular wall made from blocks such as those shown in FIG. 4 will be dependent on the angle of convergence of the end walls and the departure of the upwardly converging wall from the vertical will be dependent on the angle of convergence of the side walls.

The second of the two molds provided by the invention is disclosed at D in FIGS. 5, 6 and 7 and is constructed and adapted to make blocks of snow or ice which will form the upper part E of a domed structure such as the igloo shown in vertical section in FIG. 11. The general configuration of this second mold is that of an open top container having end walls 40, 42, side walls 44, 46 and an inwardly curved bottom 48. Hand holds 50, 52 may be provided at the upper edges of the side walls, and extending outwardly therefrom, to facilitate handling of the mold.

In accordance with the invention the end walls 40, 42 of this second mold extend outwardly from the chord of the bottom 48 at an angle which is greater than the angle at which the end walls 2, 4 of the first mold extend outwardly from the chord of the bottom of that mold, whereby blocks made with this mold, when laid end to end will form a circular tier of less diameter than the same configuration of blocks formed with the first mold. The side walls 44, 46 of this second mold extend outwardly from the transverse line of the bottom at an angle which is greater than the angle at which the side walls 6, 8 of the first mold extend outwardly from the transverse line of the bottom of that mold. Thus, when a tier of blocks made with the second mold is superimposed on another such tier with the adjacent side walls of the blocks of the two tiers flush against each other, a circular wall is formed the inward convergence of which is greater than that of a wall formed by blocks from the first mold, thus forming a dome E as shown in FIG. 11. The top of the dome may be left open, as shown, or a removable or fixed cover may be provided.

In FIG. 8 of the drawings there is illustrated a block of snow, ice or the like formed in the mold illustrated in FIGS. 5 to 7, and having the end walls 60, 62, side walls 64, 66, bottom wall 68 and outer wall 70, and part of a second similarly formed block 72 is shown in end wall-to-end-wall abutting relation to the first block in order to illustrate the formation of a circular tier, forming a part of the convex cover of the structure, by juxtaposition of the blocks.

Figure 9:
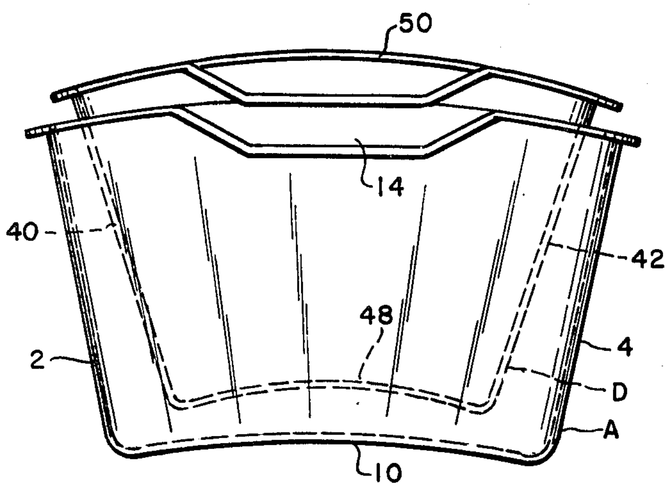
FIG. 9 is longitudinal sectional view, similar to FIGS. 2 and 6, showing the two molds in stacked condition and illustrating the angular relation of their end walls.
Figure 10:
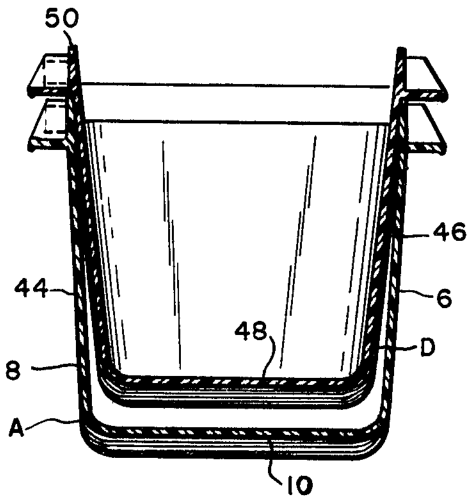
FIG. 10 is a transverse sectional view, similar to FIGS. 3 and 7, showing the two molds in stacked condition and illustrating the angular relation of their side walls.

The relative angular relations of the side walls and end walls of the two molds are shown in FIGS. 9 and 10, in which two molds are shown in stacked condition. These relative angular relations may be expressed in terms of the angle between the end walls and the side walls and the bottom, or the angle between the end walls of each mold and the angle between the side walls of the second mold D converge at a greater angle, and extend outwardly from the bottom at a greater angle, than the end walls and side walls of the first mold A, so that when tiers are formed from the blocks made in the two molds the resulting structure will have the configuration shown in FIG. 11.

It will be understood from the foregoing description that blocks made by use of the first of the molds may be used to form successive circular tiers of blocks which are superposed one on the other to form a circular wall of upwardly converging vertical configuration, the diameter of which will be dependent on the angle of convergence of the end walls of the blocks, and the angle of inward convergence of which will be dependent on the angle of convergence of the side walls. When this wall is completed, blocks formed by use of the second mold will be used to form additional tiers having greater inward inclination than the wall because of the greater angle of convergence of the side walls of the blocks, resulting in the formation of the dome which completes the structure.

I claim:

1. Apparatus for forming building blocks for the construction of a domed structure, comprising
   - (a) a plurality of first modular units each having a vertical trapezoidal cross-section and including
     - (1) a pair of planar inclined side walls converging from top to bottom at a first angle,
     - (2) a pair of planar trapezoidal end walls converging from top to bottom at a second angle, and
     - (3) a pair of curved top and bottom walls, said top wall containing an opening and having a first radius of curvature, said bottom wall having a second radius of curvature concentric with and less than said first radius; and
   - (b) a plurality of second modular units each having a vertical trapezoidal cross-section and including
     - (1) a pair of planar inclined side walls converging from top to bottom at a third angle greater than said first angle,
     - (2) a pair of planar trapezoidal end walls converging from top to bottom at a fourth angle greater than said first angle, and
     - (3) a pair of curved top and bottom walls, said top wall containing an opening and having a third radius of curvature less than said first radius, said bottom wall having a fourth radius of curvature concentric with and less than said third radius and less than said second radius, whereby a plurality of coplanar blocks formed from said first modular units are circularly arranged on their sides with their bottom surfaces facing inwardly and with their end surfaces in engagement, respectively, to define a first generally circular tier, and a plurality of said first tiers are stacked in contiguous relation, respectively, to define a concave wall, and further whereby a plurality of blocks formed from said second modular units are circularly arranged on their sides with their bottom surfaces facing inwardly and with their end surfaces in engagement, respectively, to define a second generally circular tier, and a plurality of said second tiers are stacked in contiguous relation, respectively, on top of said concave wall to define a dome.

* * * * *